(12) United States Patent
Ng et al.

(10) Patent No.: US 6,388,413 B1
(45) Date of Patent: May 14, 2002

(54) HEAD SWITCH SEEK ON DISC DRIVES WITH MULTIPLE RECORDING HEADS

(75) Inventors: Wei Loon Ng; Ming Zhong Ding; Patrick T. Wong, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/483,240

(22) Filed: Jan. 14, 2000

Related U.S. Application Data
(60) Provisional application No. 60/116,009, filed on Jan. 15, 1999.

(51) Int. Cl.[7] ............................................. G05B 11/01
(52) U.S. Cl. ..................... 318/560; 360/75; 360/77.07; 360/78.01; 360/78.14; 369/43
(58) Field of Search ................................ 318/560, 600; 360/75, 77.07, 78.14, 78.01, 98.01; 369/43

(56) References Cited

U.S. PATENT DOCUMENTS

| | | | | |
|---|---|---|---|---|
| 4,807,063 A | | 2/1989 | Moteki ..................... 360/77.07 |
| 4,809,120 A | * | 2/1989 | Ozawa ..................... 360/78.14 |
| 4,833,551 A | | 5/1989 | Song ........................ 360/77.05 |
| 4,843,494 A | * | 6/1989 | Cronin et al. ............. 360/77.03 |
| 4,896,228 A | | 1/1990 | Amakasu et al. ........ 360/77.08 |
| 4,924,160 A | | 5/1990 | Tung .......................... 318/561 |
| 5,132,854 A | | 7/1992 | Tsuyoshi et al. .......... 360/78.14 |
| 5,239,433 A | * | 8/1993 | Watanabe .................... 360/124 |
| 5,307,218 A | | 4/1994 | Kitamura et al. ........ 360/77.08 |
| 5,321,564 A | | 6/1994 | Takahashi et al. ........ 360/77.04 |
| 5,477,402 A | | 12/1995 | Elliott et al. ............. 360/77.08 |
| 5,581,420 A | * | 12/1996 | Chainer et al. ................ 360/75 |
| 6,067,206 A | * | 5/2000 | Hull et al. ................ 360/77.08 |
| 6,081,397 A | * | 6/2000 | Belser .......................... 360/51 |
| 6,081,399 A | * | 6/2000 | Lee et al. ...................... 360/75 |

OTHER PUBLICATIONS

"Japanese Abstract for JP 1–106375", 1 page, (Apr. 24, 1989).

* cited by examiner

*Primary Examiner*—Robert E. Nappi
*Assistant Examiner*—Rita Leykin
(74) *Attorney, Agent, or Firm*—Shawn B. Dempster; Derek J. Berger; Kirk A. Cesari

(57) ABSTRACT

A disc drive includes a base and a disc rotatably attached to the base. The disc drive also includes an actuator assembly rotatably attached to said base and a device for moving the actuator assembly. The disc drive includes servo circuitry and a controller for controlling movement of the actuator and head switches during track seek operations. The disc drive determines the average seek time for each head and also measures the amount of time for a head switch from the transducer head having the shortest average seek time to all the other transducing heads in the disc drive. When a seek is performed, the controller in the disc drive determines if the shortest average seek time plus the seek time from the transducing head to the transducing head on the surface containing the target track and sector is less than the average seek time of the head on the surface having the target track and sector.

18 Claims, 7 Drawing Sheets

HEAD SWITCH SEEK ON DISC DRIVES WITH MULTIPLE RECORDING HEADS

RELATED APPLICATION

This application claims the benefit of U.S. Provisional Application Ser. No. 60/116,009, filed Jan. 15, 1999 under 35 U.S.C. 119(e).

FIELD OF THE INVENTION

The present invention relates to the field of mass storage devices. More particularly, this invention relates to an apparatus and method for moving a transducing head within a disc drive from a first track to a second track. The operation of moving a transducing head from a first track to a second track is commonly called a seek.

BACKGROUND OF THE INVENTION

One key component of any computer system is a device to store data. Computer systems have many different places where data can be stored. One conmmon place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area The negative pressure or suction counteracts the pressure produced at the rails. The slider is also attached to a load spring which produces a force on the slider directed toward the disc surface. The various forces equilibrate so the slider flies over the surface of the disc at a particalar desired fly height. Tile fly height is the distance between the disc surface and the transducing head, which is typically the thickness of the air lubrication film. This film eliminates the friction and resulting wear that would occur if the transducing head and disc were in mechanical contact during disc rotation in some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc Similarly, reading data on a storage disc is accomplished by positioning the read/write head above a target track and reading the stored material on the storage disc. To write on or read from different tracks, the read/write head is moved radially across the tracks to a selected target track.

The methods for positioning the transducer can generally be grouped into two categories Disc drives with linear actuators move the transducer linearly generally along a radial line to position the transducers over the various tracks on the information storage disc. Disc drives also have rotary actuators which are mounted to the base of the disc drive for arcuate movement of the transducers across the tracks of the information storage disc. Rotary actuators position transducers by rotationally moving them to a specified location on an information recording disc. A rotary actuator positions the transducer quickly and precisely.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

Quick and precise positioning requires the reduction of the vibration of the magnetic disc apparatus caused by the driving reaction force to the voice coil motor. What is needed is a disc drive which is less susceptible to the reaction forces. This will improve settling characteristics after a seek from a first track on the disc to a target track on the disc and will improve track following operations of the disc drive. In other words, there is a need for a disc drive that has less relative motion between the actuator assembly and the base while under any type of servo control that requires corrections to be implemented with the voice coil motor. There is also a need For a static solution so that the resulting disc drive is more reliable over the life of the drive. Also needed is a device that can be assembled using current assembly techniques.

One constant goal associated with disc drives is to decrease or lessen the access time to data. Increasing the speed at which data can be retrieved is very desirable in a disc drive. The decrease in access time increases the speed at which a computer system can perform operations on data. When a computer is commanded to perform an operation on data or information that needs to be retrieved, the time necessary to retrieve the data from the disc is generally the bottleneck in the operation. When data is accessed more quickly, more transactions can generally be handled by a computer in a particular unit of time.

Most of the methods for control access time include referring to a velocity profile. A velocity profile is a preprogrammed equation or table which lists a desired velocity verses the stopping distance remaining until reaching the target track. In other words, a velocity profile provides the velocity the transducer head should have at varying distances from the destination or target track and, at each of a succession of tracks terminating with the destination or target track. Generally, the profile velocity value is the highest possible value of velocity the actuator can have at a particular remaining distance to allow the actuator to be decelerated to a stop upon reaching the destination or target track. Of course, there may be factors, such as power savings, that may steer designers away from following the highest possible velocity.

The velocity profile is shaped with respect to the number of tracks remaining in a seek to cause the transducer head to initially accelerate toward the destination or target track and subsequently decelerate to the destination or target track. In long seeks, these stages of the seek may be separated by a stage in which the transducer head traverses a series of tracks at a maximum speed that is selected on the basis of any of a number of criteria used by the manufacturer of the disk drive. For example, the maximum speed may be chosen to be the maximum speed the transducer head can attain with the power supply that is used to operate the servo system. A control signal is provided to the power amplifier that is directly proportional to the difference between the profile velocity and the actual velocity of the transducer head.

A typical seek is accomplished using closed loop control. The distance left to go to the destination or target track is determined and then the corresponding velocity from the velocity profile is selected. The difference between the actual actuator velocity and profile actuator velocity is provided to the servo controller. This value is then multiplied by a gain to give a control current output to the voice coil.

When the profile velocity is larger than the actual velocity, the result of subtracting actual actuator velocity from the selected velocity obtained from the velocity profile is positive, and the actuator is accelerated When the profile velocity is less than actual velocity, the result of subtracting actual actuator velocity from the selected velocity form the velocity profile is negative, and the actuator is decelerated. The gain is chosen in the closed loop control method so that it is as high as possible yet still within the limits of stability and such that good conformity to the velocity profile is achieved.

The use of a velocity profile that can be developed with respect to any selected servo system operating criteria can be used to minimize the time required for the seek to occur and still reach the destination track with a speed that is neither too large nor too small to effectuate a rapid settling of the transducer bead on the destination track at the end of the seek. Specifically, since the control signal is proportional to the difference between the profile velocity and the actual velocity, the transducer bead can be caused to rapidly accelerate at the beginning of the seek by providing a profile that calls for large velocities at the beginning of the seek and then rapidly tapering the profile to zero as the destination track is reached.

The amount of deceleration that can be applied to the actuator is a function of many variables including voice coil resistance file torque constant and power supply voltage. These variables are generally not known for each specific file and as a result, the velocity profile is designed using worst case values to assure that there will always be adequate deceleration capability to stop the actuator upon reaching the target track.

Due to manufacturing tolerances of all the parts that are assembled to form an actuator, it turns out that each transducer on each arm has a different seek time for a given length of seek. For example, different load beams and flexures have different settling times. One of the shortcomings associated with prior seek methods is that the velocity profile is designed to accommodate the slowest seek time of the transducer heads in a population of disc drives. This assumes the worst case conditions so that adequate margin is available for both acceleration and deceleration for a given velocity profile. As a result, all of the disc drives operate under worst case conditions at less than an optimal level. In other words, the actuators operate at suboptimal velocities rather than operating a more optimal velocity.

What is needed is a seek procedure that allows for faster seeks. What is also needed is a seek procedure which can be accommodated using manufacturing techniques close to current manufacturing techniques.

SUMMARY OF THE INVENTION

A disc drive includes a base and a disc rotatably attached to the base. The disc drive also includes an actuator assembly rotatably attached to said base and a device for moving the actuator assembly. The disc drive includes servo circuitry and a controller for controlling movement of the actuator during track follow and track seek operations. The controller also controls head switches between various transducing heads in the disc drive. The disc drive determines the average seek time for each head and also measures the amount of time for a head switch from the transducer head having the shortest average seek time to all the other transducing heads in the disc drive. When a seek is performed, the controller in the disc drive determines if the shortest average seek time plus the seek time from the transducing head to the transducing bead on the surface containing the target track and sector is less than the average seek time of the head on the surface having the target track and sector. If the shortest average seek time and the head switch time is less than the average seek time of the head on the surface, the controller uses the head with the shortest average seek time to perform the seek and then switches to the transducing head associated with the target or destination track so that the information under that head can be read.

The disc drive controls the movement of an actuator in a disk drive from a first track to a second track on a target surface. The actuator has a plurality of transducers attached to a plurality of arms of the actuator. The method includes determining the average access times for each of the transducing heads in the disc drive, and measuring the amount of time for a head switch from each of the plurality of transducing heads to the transducing head of the plurality of transducing heads having the shortest average access time. The average seek time associated with a transducing head on a target surface is compared to an amount of time associated with the average seek time of the transducing head having the shortest average seek time plus a head switch from the transducing head with the shortest average access time to the transducing head on the target track. A seek may be performed with a transducing head other than the transducing head associated with the target surface. Such a seek is performed when the amount of time associated with the average seek time of the transducing head on the target surface plus a head switch from the transducing head with the shortest average access time is less than the average seek time associated with a transducing head having the shortest average seek time.

The comparison further includes storing the average seek times of each head on a table and determining the transducing head with the shortest average seek time and performing head switches between the head with the shortest average seek time and each of the other transducing heads in the disc drive. In addition a value is stored for each of the other transducing heads equal to the average seek time for a particular head plus the head switch time between the particular transducer head and the tansducer head with the shortest average seek time. The value for each of the transducing head may be stored in a lookup table in memory or on the disc. If on the disc, the lookup table is stored at a reserve area on one of the plurality of discs. When the lookup table is stored at a reserve area on one of the plurality of discs, the information is uploaded from the disc to memory Also disclosed is a disc drive having a base, a disc rotatably attached to the base. Servo information is stored on each of the surfaces of the disc. One of said surfaces of the disc has a first track and a second track. The other of said surfaces has a third track and a fourth track An actuator has a first transducer for reading and writing to the first and second track and a second transducer for reading and writing to the third and fourth track. A computer usable storage medium, having control information stored thereon for causes a suitably programmed disc drive to seek from a first track on the disc to a second track on a disc using the transducer for reading the third and fourth track on the disc. The computer usable storage medium performs the following steps: seeking between the third and fourth tracks with the second transducer head, and switching from the second transducer head to the first transducer head. The computer usable storage medium stores control information indicating when the time associated with seeking between the third and fourth tracks with the second transducer and switching from the second transducer to the first transducer is faster than seeking between the first and second tracks with the first transducer. The computer usable storage medium controls servo circuitry to seek between the third and fourth tracks and switch to the first transducer when it will be faster than seeking between the first and second tracks with the first transducer. The first and third tracks are within a first cylinder and the second and fourth tracks are within a second cylinder. The control information in the computer usable storage medium includes using the servo circuitry within the disc drive. The servo circuitry within the disc drive is to determine if a seek can be performed in the disc drive between a first cylinder containing the first track and the third track and the a second cylinder containing the second track and the fourth track in less time when seeking between the third track and the fourth track than between the first track and the second track. This can be done at the time of manufacture.

Also disclosed is a disc drive including a base and an actuator rotatably attached to the base. The actuator has a first end and a second end and further includes a transducing head attached to the other of the first or second ends of the actuator. At least one disc is rotatably attached to the base. The disc has a first surface and a second surface. The invention includes a device for performing a seek between tracks on a first surface while using information stored on the second surface and the transducing head on the second surface.

Advantageously, the seek procedure set forth above and the apparatus for implementing the seek procedure allow for faster seeks. The seek procedure can be incorporated in microcode and used to control the servo circuitry to implement the invention. The information needed can easily be obtained during the manufacture of the disc drive. Obtaining the information needed can be accomplished without deviating substantially from manufacturing techniques close to current manufacturing techniques. The end result will be a reduction in access times to data.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
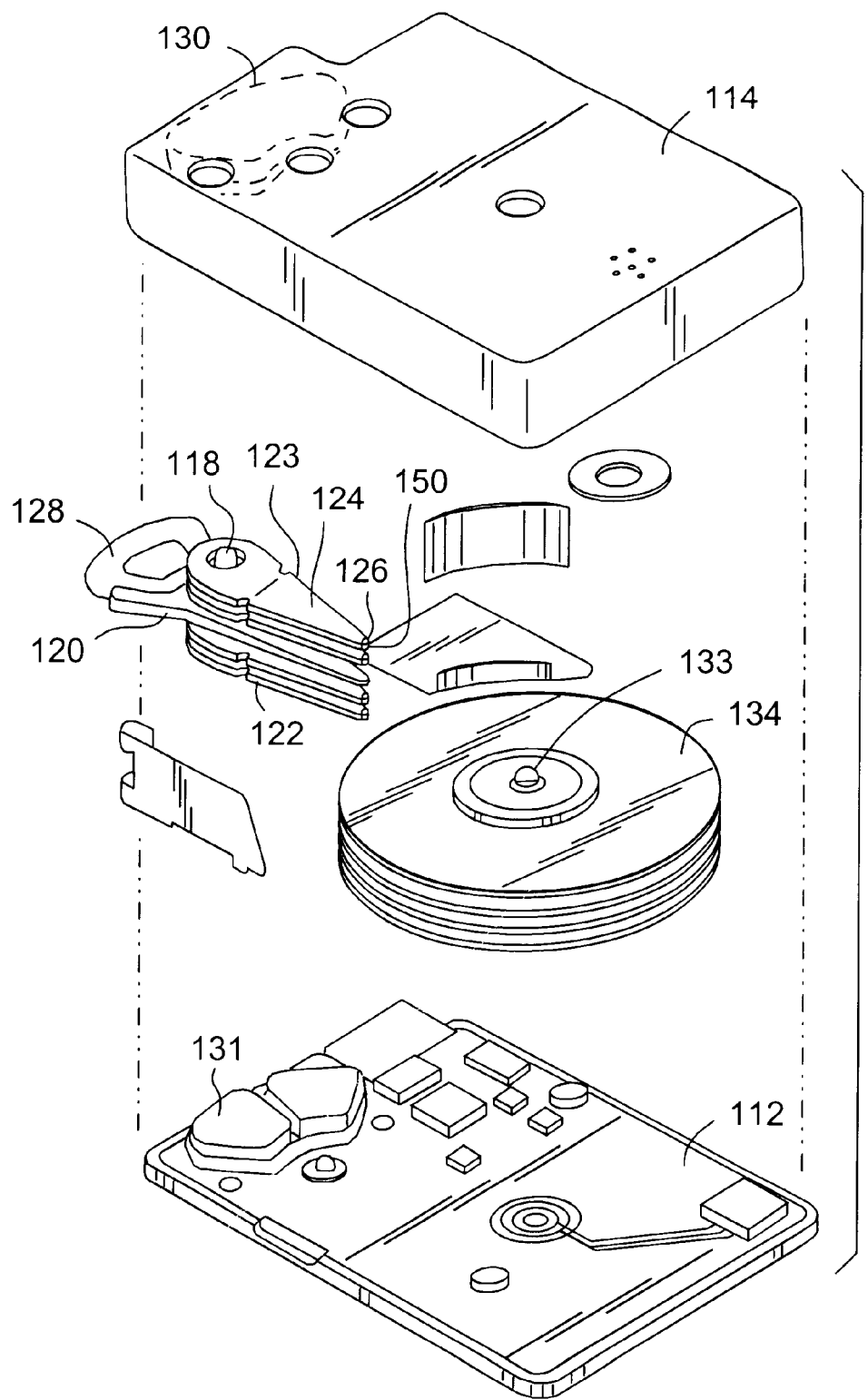
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 9:
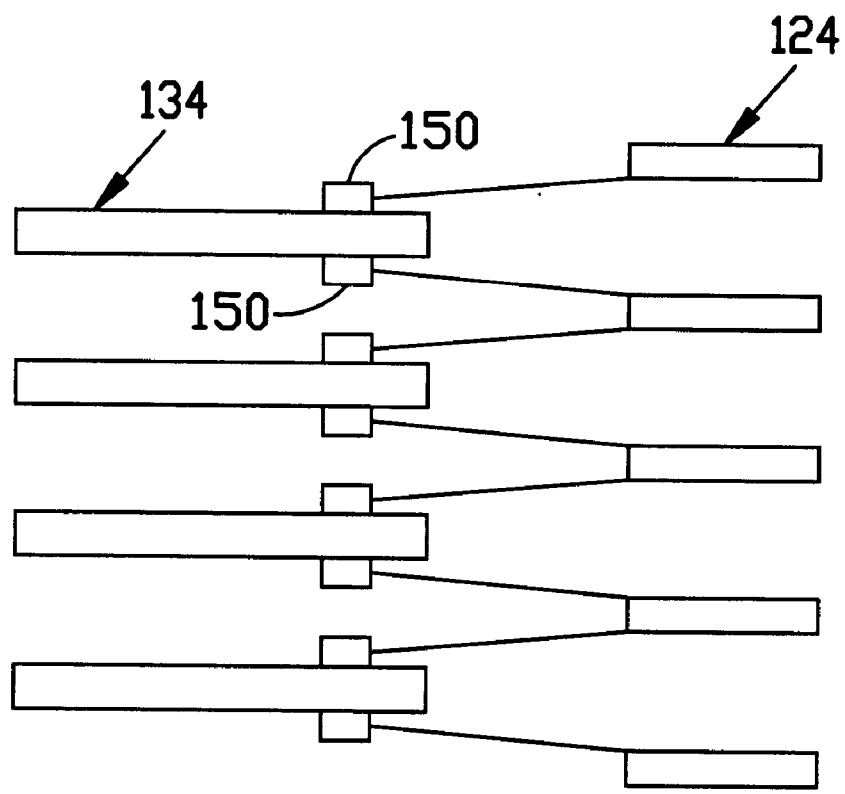
FIG. 9 is an enlarged side view of the discs and heads of the disc drive of FIG. 1.

FIG. 9 is an enlarged side view of the discs and heads of the disc drive of FIG. 1. FIG. 9 shows that many of the disc 134 surfaces have a head associated with the surface.

Figure 2:
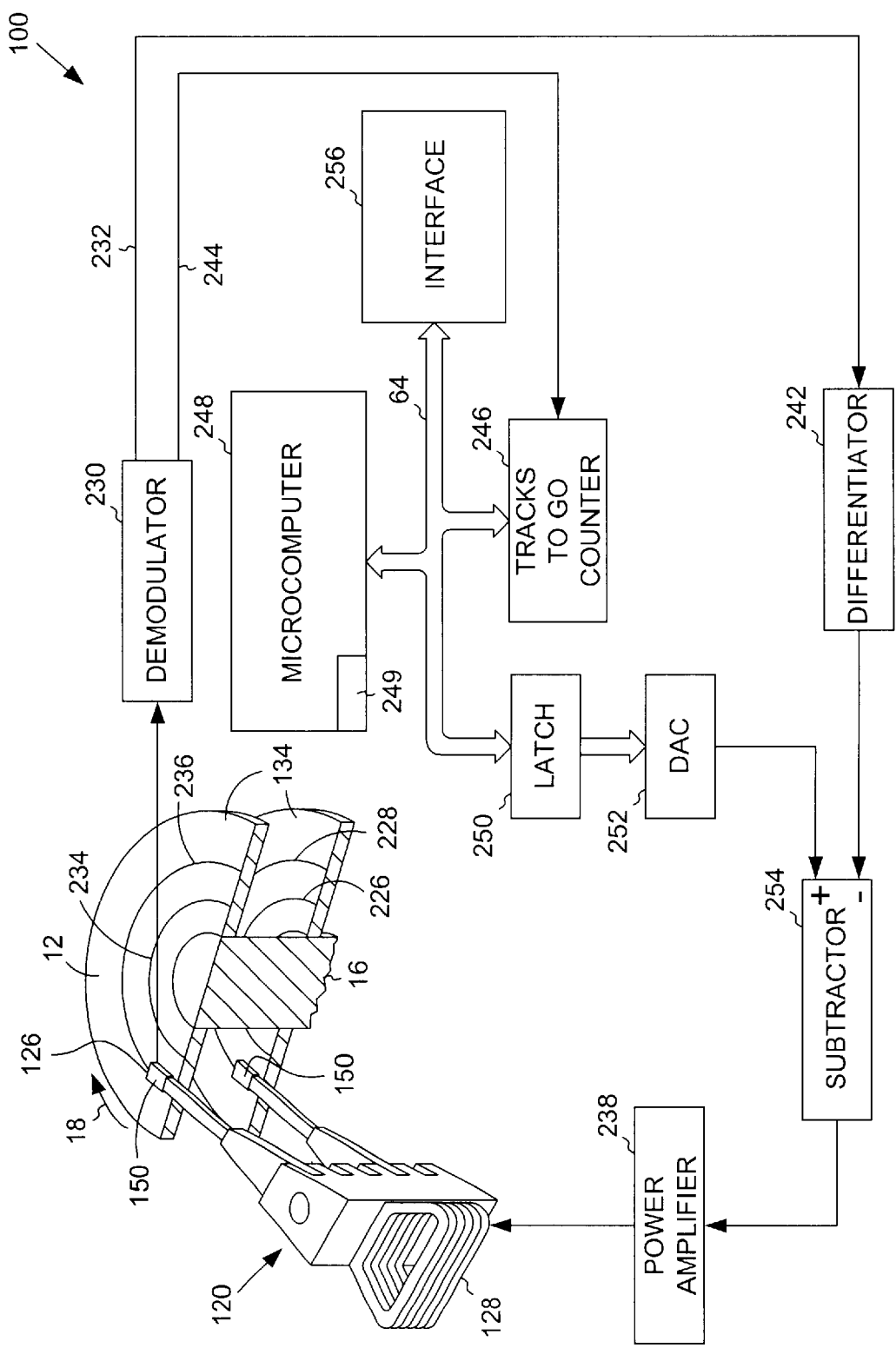
FIG. 2 is an schematic representation of a hard disc drive including portions of the servo circuit used in seeking between tracks on rotating discs of the disc drive.

FIG. 2 is a schematic representation of a disc drive 100 and further includes selected portions of the servo circuit used in seeking between tracks on rotating discs 134 of the disc drive. As shown in FIG. 2, the disc drive is further comprised of a servo circuit (not generally designated in the drawings) that is used both to maintain the radial alignment of the transducer heads 126 with the data tracks in a track following mode of operation and to move the transducer heads from an initial track currently being followed to a destination or target track, to which data is to be written or from which data is to be read, in a seek mode of operation. By use of such a servo circuit, the data tracks can be very closely spaced to provide the large data capacity that has been noted above.

A scheme which is commonly used to effect both track following and seeking is to embed servo information into each of the disc surfaces. A servo pattern is written in wedge-shaped pieces. Data is stored between the servo information. The servo pattern is read as the disk rotates to determine the current location of the transducer heads with respect to the tracks on the disks, and to adjust the position of the actuator accordingly. The embedded wedges of servo information are placed on each of the discs 134. This is commonly referred to as embedded servo. In this arrangement, each of the transducer heads reads both information representative of data as well as information representative of servo or location. Any type of servo pattern may be used. One example of a servo pattern is the tri-phase servo pattern taught by Donald W. Janz in U.S. Pat. No. 4,811,135. Again, the present invention is not limited to any particular type of servo pattern that might be used in carrying out track following or seeking.

With these considerations in mind, each transducer head 126, is electrically connected to a demodulator 230 that periodically receives a servo signal induced in the bead 126 by passage of edges of the servo pattern. The resulting servo signals are used by the servo circuit to effect either track following or seeking. As is common practice, the demodulator 230 senses the relative magnitudes of successive emf pulses and provides a servo position error signal, on a conducting path 232, whose magnitude is proportional to the displacement of a particular transducing head 126 from the nearest servo track, two which have been indicated at 234 and 236 in FIG. 2, that are defined by the servo pattern. During track following, the servo position error signal is transmitted to a flue control circuit (not shown) that generates a control signal that is, in turn, transmitted to the input of a power, transconductance amplifier 238 and the amplifier 238 adjusts the current through a coil 128 on the end of the actuator 120 in proportion to the magnitude of the control signal. The coil 128 is immersed in a magnetic field provided by permanent magnets 130, 131 (shown in FIG. 1) mounted about the coil 128 so that a force tending to pivot the actuator 120 is exerted on the actuator in proportion to the current through the coil 128 in accordance with the Lorentz relation. Thus, during track following, the servo circuit provides control signals indicative of the location of the head 126 in a fine control region about the track being followed and the servo circuit continually moves the actuator 120 to maintain the servo head in radial alignment with a selected portion of servo information on the selected track. The tracks on remaining disk surfaces are arranged in cylinders. When servo information is written each track includes both servo information and sectors for holding information representing data. Even if the tracks are not in perfect vertical alignment, all the tracks having the same number are written so that when one head 126 is at a given position over a track all the other heads 126 are also positioned over a similarly numbered track.

In order to effect track seeking, with which the present invention is concerned and which will be described in detail below, the servo position error signals are differentiated to obtain the velocity of the servo head across the surface of the disk 134 and, for this purpose, the servo circuit shown in FIG. 2 is comprised of a differentiator 242 which receives the servo position error signals on the conducting path 232. Further, the demodulator 230 also provides track crossing signals, on a conducting path 244, indicative of movement of the servo head from the fine control region about one track to the fine control region about an adjacent track, that are received by a tracks to go counter 246 whose purpose will be discussed below.

The present invention contemplates that seeks between tracks will be accomplished by comparing the actual velocity of the transducing bead 128 to a demand velocity generated as will be discussed below and, to this end, the servo circuit shown in FIG. 2 is comprised of a microcomputer 248 that generates the demand velocity and periodically outputs such velocity to a latch 250 and, via a digital to analog converter 252, to the positive input of a conventional subtractor 254. The negative input of the subtractor 254 receives the output of the differentiator 42 so that the output of the subtractor provides a control signal that is proportional to the difference between the demand and actual velocities of the transducing head 128. The output of the subtractor 254 is connected to the input of the power amplifier 238 so that the servo head is accelerated and decelerated, during seeks, in proportion to the difference between the actual velocity of the transducing head 128 and the demand velocity. Thus, by providing a sequence of demand velocities, the transducing head can be caused to initially accelerate from the track it is currently following and then decelerate to any selected target or destination track. Such selection is provided to the microprocessor 248 from an interface 256 that communicates the hard disk drive 100 with a host computer which generates data stored in the drive.

Figure 3:
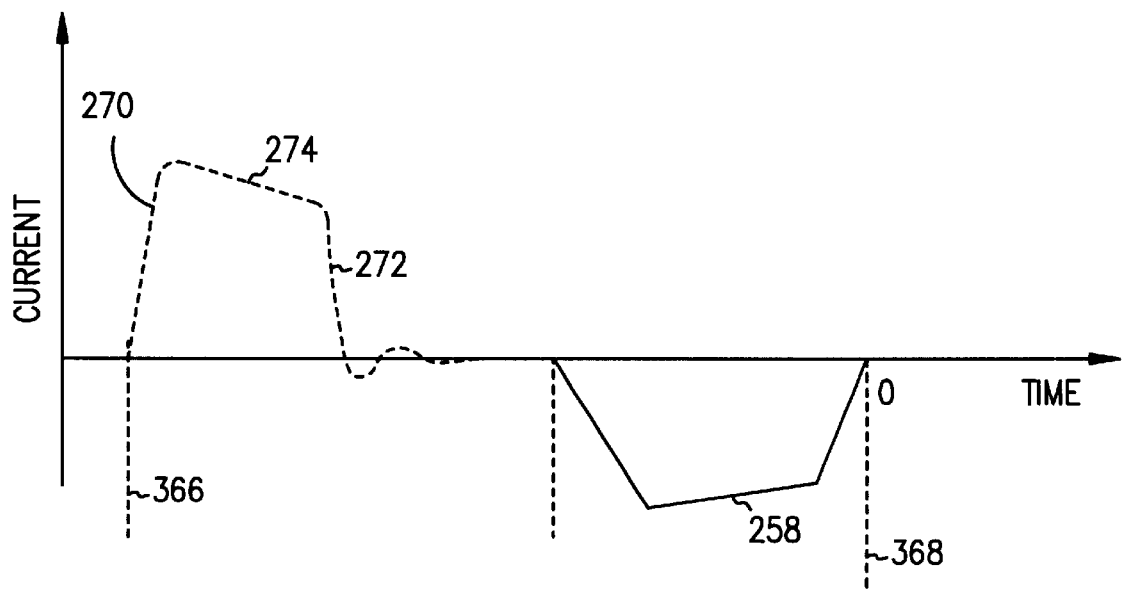
FIG. 3 is graph of actuator current as a function of time during a seek.

Generally, seeking has been effected by outputting to the latch 250 a sequence of demand velocities that are taken from a velocity profile that is generated in a manner shown in FIG. 3. Initially, the development of a velocity profile begins with the selection of a current profile that indicates the desired current through the actuator coil 128 as a function of time during deceleration of the transducing head 128 to a destination or target track which may be any track on the disk. Typically such profile will have the form indicated at 58 in FIG. 3 in which the coil current has been plotted on the ordinate, time has been plotted on the abscissa and deceleration has been indicated by negative values of the current. Acceleration will be indicated by positive currents. The current profile 258 can be selected in accordance with any desired criteria including vibration of the hard disk drive and consequent noise that may be generated during a seek Once the current profile 258 has been selected, the velocity of the transducing head 126 as a function of time during deceleration can be determined from a selected maximum velocity the transducing head 126 is to attain during a seek by integration of the profile 258. The total time for the deceleration is selected so that, for a particular servo system, the selected profile 258 will cause the transducing head 126 to come to rest at the destination or target track at the end of the deceleration.

Figure 4:
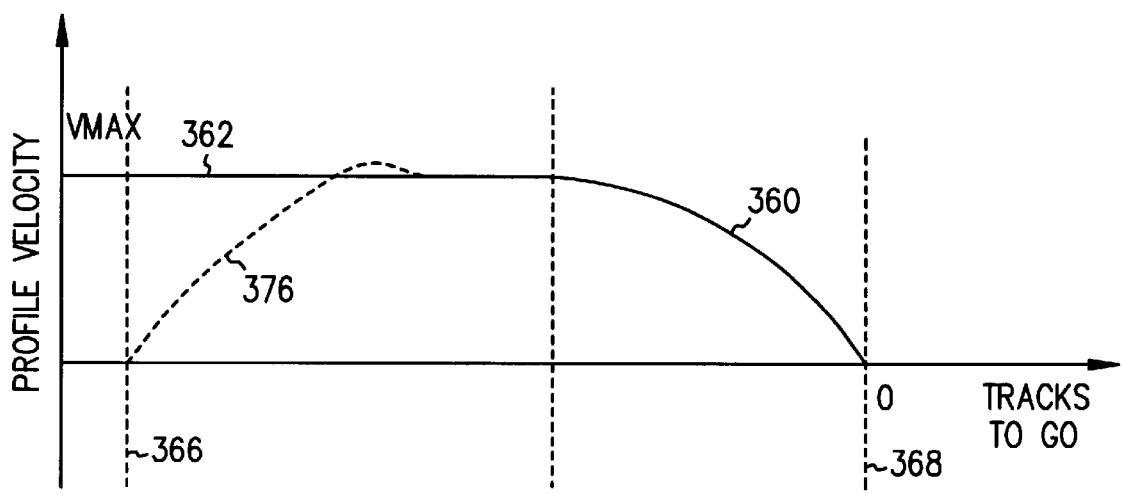
FIG. 4 is a graph of a velocity profile developed from the current relation shown in FIG. 3.

A second integration will yield the distance that the servo head will move as a function of time during the deceleration so that elimination of time between the velocity and distance expressions will yield a deceleration portion 260 of a velocity profile that indicates a profile velocity as a function of the number of tracks to go with the destination track corresponding to zero tracks to go as indicated in FIG. 4. The portion 360 of the velocity profile will be defined only for the number of tracks required to bring the transducing head 128 to rest, using the current profile 258, from the maximum velocity during a seek as indicated at vmax in FIG. 4. The velocity profile is then extended to any number of tracks by selecting the value vmax for the profile velocity for longer seeks as indicated by the portion 362 of the curve shown in FIG. 4.

In conventional seek methods, the profile velocity is chosen as the demand velocity to be periodically outputted to subtractor 254 and the velocity profile indicating the profile velocity as a function of tracks remaining in a seek is stored in a look-up table in the microcomputer 248 so that seeks can be effected as will now be described. At the beginning of the seek, the interface 256 will provide a signal to the microcomputer 248 that a seek is to be made and, further, will place the destination track number to which the seek is to be made on the data bus 264 of the microcomputer 248. In response, the microcomputer will determine from the track number of the track presently being followed and the destination track number the number of tracks to go in making the seek and such number will be outputted to the tracks to go counter 246. The number of the track that is presently being followed can be maintained in the memory of the microcomputer 248 by moving the servo head to track zero as part of he start-up procedure for the disk drive 100 and then updating the current location in memory each time a seek is made.

Once the counter 246 has been initialized, the profile velocity corresponding to the number of tracks the head is to be moved is outputted to the latch 250 so that the subtractor 254 will provide a control signal that is proportional to the difference between the profile velocity and the actual velocity of the head; that is, zero at the start of the seek. Thus, for example, if the initial and destination tracks are as indicated by the dashed lines 366 and 368 in FIGS. 3 and 4, the microcomputer 248 will call for the maximum velocity the transducing head 128 is to attain during the seek. Since the actual velocity begins at zero, the subtractor will provide a large control signal to the power amplifier 238 to cause a rapid initial rise in the current through the coil 128 as indicated at 270 in FIG. 3 in which the current during the acceleration of the transducing head 128 has been indicated in dashed line. The result is that the transducing head 128 will be rapidly accelerated toward the destination track.

As the seek progresses, the transducer transducing head 128 will leave the fine control region about the initial track to pass into a succession of fine control regions about tracks between the initial and destination tracks and, each time the head enters a new fine control region, the demodulator 230 will provide a track crossing pulse to the tracks to go counter 246 to decrement such counter with the result that the counter 246 will contain a continuous record of the number of tracks remaining in the seek to the destination track. The microcomputer 248 is programmed to periodically read the tracks to go counter 248 and, in response to the value contained therein, look up the profile velocity associated with the remaining distance to the destination track in accordance with the stored velocity profile and output the profile velocity to the latch 250. Concurrently, the demodulator 230 generates servo position error signals that are transmitted to the differentiator 242 so that a signal indicative of the actual velocity of the transducer transducing head 128 across the disk 134 continuously appears at the output of the differentiator 242 The actual and profile velocities are transmitted to the inputs of the subtractor 252 so that, each time a new profile velocity is read, a control signal proportional to the difference between the two is transmitted to the power amplifier 238 to adjust the current through the actuator coil 128. Thus, as the velocity of the transducing bead 128 approaches the maximum velocity the head is to have during a seek, the current through the coil 128 will drop toward zero as indicated at 272 in FIG. 3. Generally, this drop in current will initially be very rapid and will subsequently become zero as the actual velocity of the transducing head 126 stabilizes on the maximum velocity Vmax. In order to minimize the time for the seek to be made, the proportionality constants for the power amplifier 238 and the subtractor 254 are made large enough that the current through the coil between the two portions 270, 272 of the current versus time curve will be determined by the power supply voltage and the back emf induced in the coil 128 by movement of the coil through the magnetic field in which it is immersed so that the entire current versus time profile will further exhibit a slowly decaying portion that has been indicated at 274 in FIG. 3. As the actual velocity of the transducer transducing head 128 approaches the maximum profile velocity Vmax, the control signal from the subtractor 254 will decrease toward zero so that the actual velocity of the transducer transducing head 128 will approach the velocity profile along the dashed line 376 in FIG. 4.

Once the maximum profile velocity has substantially been attained by the transducer transducing head 128, such velocity will be maintained until the head reaches the distance from the destination track required to decelerate the transducing bead 128 from the maximum seek velocity to rest in accordance with the deceleration current profile 258 and the transducing head 128 will then decelerate in accordance with the current profile 258 and portion 360 of the velocity profile derived therefrom.

Figure 5:
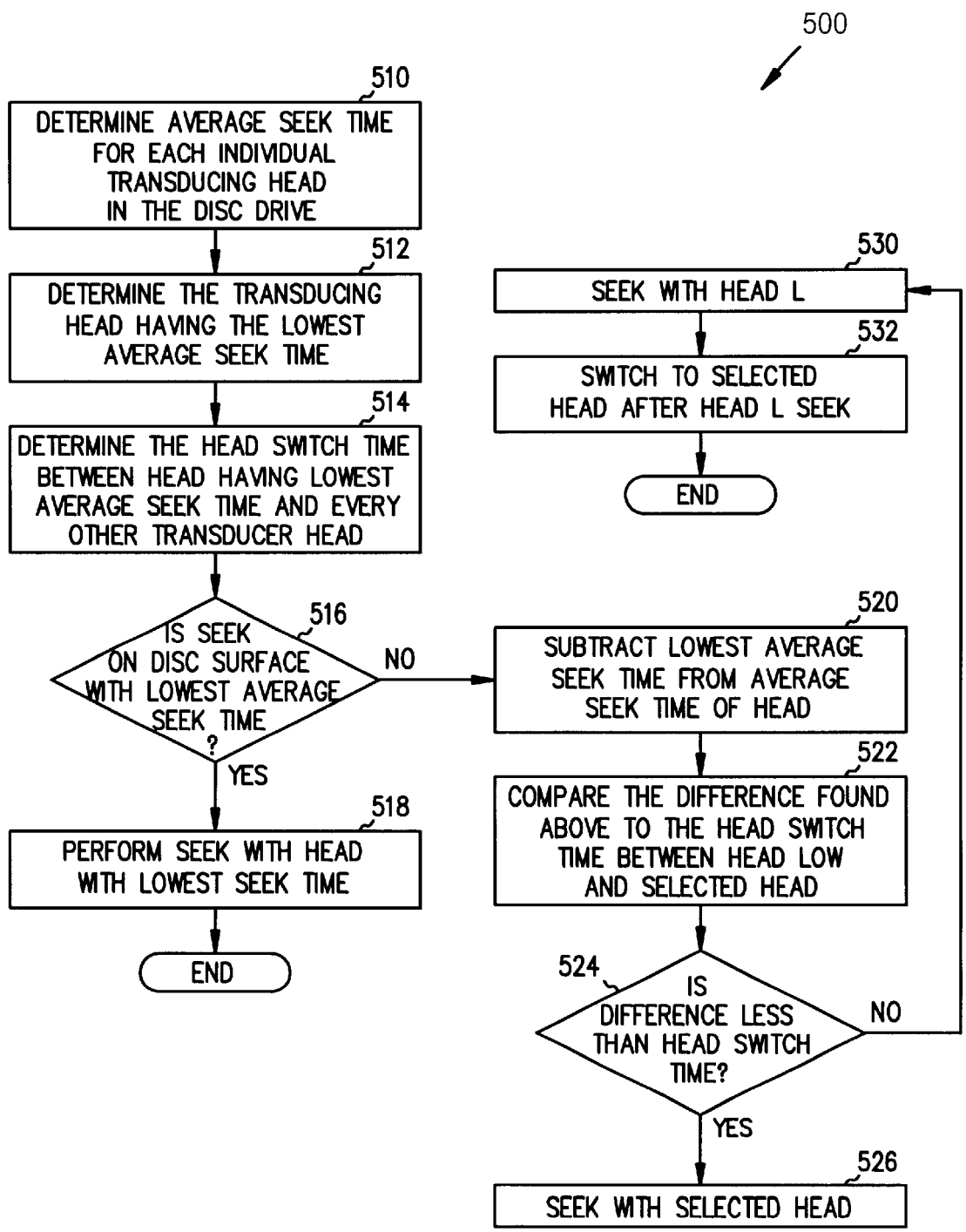
FIG. 5 is a flow diagram of the seek procedure of the instant invention.

FIG. 5 is a flow diagram of the seek procedure 500 of the instant invention. The first step in the seek procedure 500 is to determine the average seek time for each individual transducing head 128 in the disc drive 100, as depicted by reference numeral 510. After the average seek time for each individual transducing head is determined, the transducing head 128 having the lowest average seek time is noted, as depicted by reference numeral 512. The head having the lowest average seek time will be referred to as head L. Next, the head switch time between the transducing heads other than L and the transducing head with the lowest average seek time, L, is determined, as depicted by reference numeral 514. In other words, the head switch time between a particular head and the head with the lowest average seek time is determined for each of the remaining transducer heads 126 in the disc drive 100. Next it is determined whether the data to be obtained happens to be underneath the head with the lowest average seek time, as depicted by reference numeral 516. If the data is beneath the transducing head L, the seek is performed with the transducing head L, as depicted by step 518. Once the seek is complete, the seek process ends.

If on the other hand, the data is not located below the head with the lowest seek time, the lowest average seek time associated with head L is subtracted from the average seek time of the particular head under which the data is located, as depicted by step 520. It can be said that the data sought is on a target surface or at a target or destination track. As shown in FIG. 2, there are four tracks that are set forth on the various surfaces of the discs 134 for the purpose of illustration. The track 234 and track 236 are located on one disc surface while the tracks 226 and 228 are shown on another disc surface Seeks can be of different length and these tracks are only shown and described for illustrative purposes. The tracks 234 and 226 are in a first cylinder and the tracks 236 and 229 are in a second cylinder. A track is inside a particular cylinder when it is at a particular radius away from the center of the disc 134. In other words, tracks within a cylinder are at approximately the same radial position outward from the center of the disc 134 or the center of all the discs 134. Once the difference between the lowest average seek time and the average seek time of the head is found, the difference is compared to the head switch time between the selected head for the target track or target surface and the head L which has the lowest average seek time, as depicted by reference numeral 522. If the difference between the two seek times is less than the head switch time, then the seek should be accomplished with the selected head that is positioned over the target surface, as depicted by step 526. If the difference between the two seeks is not less than the head switch time, then the seek is done with head L or the head with the lowest average seek time, as depicted by step 530. After the seek with head L is completed, a head switch is performed from head L to the head or transducing head positioned over the target track or target surface, as depicted by 532. In other words, a determination is made as to whether it will be quicker to seek with the head with the lowest average seek time and then switch to the head positioned over the target track, as opposed to just seeking with the head positioned over the target surface which includes the target track. If it is quicker to seek with head L and then do a head switch from head L to the transducer positioned over the target track, that will be done. If it does not save time to seek with head L and then switch to the head positioned over the target or destination track, the seek is merely accomplished using the head positioned over the target surface.

The basic idea of this patent application is to use the recording head with the shortest seek time for seeking and subsequently switch to the target recording head once the servo is positioned, within off-track limits, to the target track. Due to the fact that recording head switching will also add onto the overall seek time, it will only make sense to employ this new seek method if the fastest seeking head plus head switching time is shorter than the average seek time of the actual recording bead.

Figure 6:
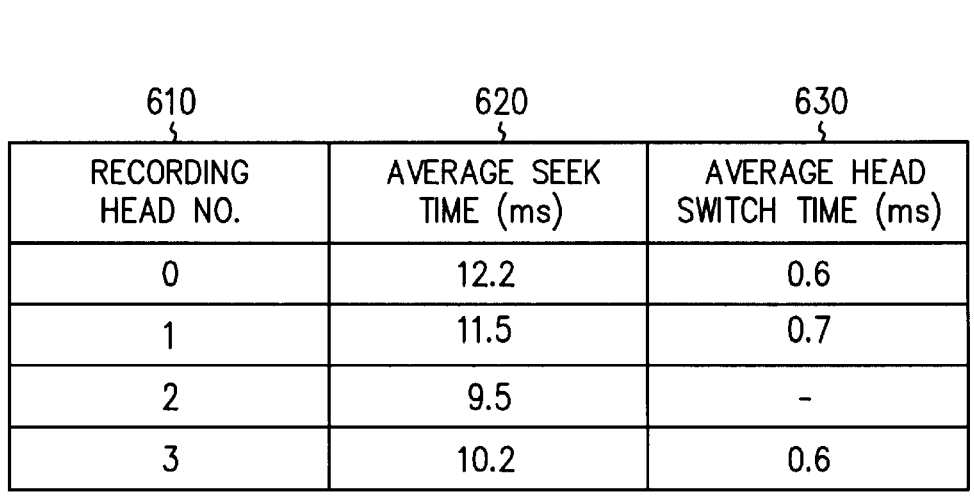
FIG. 6 is a table showing the recording head, the average seek time and the average head switch time.

During the process of manufacturing, the seek performances of each recording head is measured to find out the variances in seek and recording head switching times. The table shown in FIG. 6 is a typical servo performance for a four head disc drive. The table shown in FIG. 6, having the reference numeral 600, includes a first column 610, a second column 620 and a third column 630. The recording head is shown in the first column 610 and the average seek time on the surface is shown in the second column 620. So, for example, an average seek time for recording head 0 is 12.2 milliseconds. This is the amount of time it takes to go from a first track on the surface underneath the head 0 to be moved and settled at a second track on the same surface. The average seek time is figured out for each of the particular heads 0, 1, 2 and 3. The third column 630 is the average head switch time between the head having the lowest average seek time, which has been termed head L and which equals head number 2 in this particular example, and the other heads. For example, it takes 0.6 milliseconds to switch from head 0 to head 2 and 0.7 milliseconds to switch from head 1 to head 2 and 0.6 milliseconds to perform a head switch between head 3 and head 2. This type of table can be used to determine which of the recording heads to perform the seek with FIG. 7, which shows table 700, includes the same first three columns 610, 620 and 630 of the Table 600 shown in FIG. 6. In the last column, a new seek time 710 is determined. By adding the average seek time of head L (the head with the lowest average seek time) to the average head switch time associated with the recording head. For example, the new seek time for recording head 0 is equal to 9.5+0.6 microseconds which equals 10.1 microseconds. 9.5 is the lowest average seek time of head L, or in this case, head 2, and the average head switch time is that head switch time associated with head 0. Since 10.1 microseconds is less than the average seek time associated with head 0, which equals 12.2 microseconds, a seek will always be done using head 2 and then a head switch from head 2 to head 0 will be used to complete the seek, rather than doing a seek using head 0. Basically, the average seek time associated with doing a seek with head 0 is longer than performing a seek with head L and switching from head L to head 0 to perform the seek. The new seek time associated with head 1 is also less than the average seek time associated with head 1 and, therefore, head 2 or head L will be used to perform the seek and a head switch from head L to head 1 will be used to perform a seek on the surface below head 1. Head 3 has a new seek time equal to 9.5+0.6 which equals 10.1 milliseconds. The 10.1 milliseconds is greater than the 10.0 milliseconds for the average seek time underneath head 3. Therefore, rather than put in a new seek time, the average seek time of head 3 remains in the new seek time column 710. In other words, it is quicker to go and do a seek with head 3 than to switch to head 2 or head L and then have a head switch from head L to head 3. As a result, the seek is merely performed with head 3.

Figure 7:
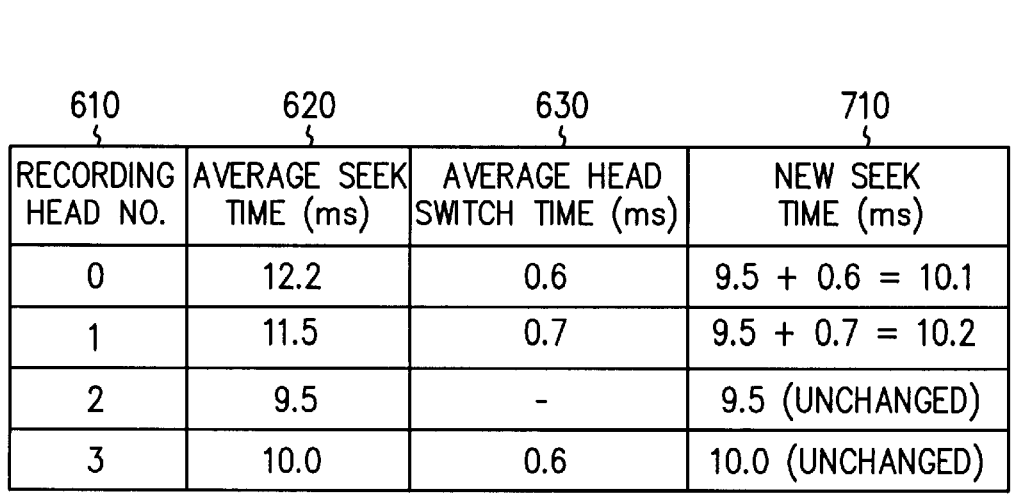
FIG. 7 is a table showing the recording head, the average seek time, the average head switch time, and the new seek time.

It should be noted that Tables 600 and 700 shown in FIGS. 6 and 7, respectively, are merely examples of how the scheme will work and the data that will be used. It should be noted that these tables can be produced at the time of manufacture by measuring the average seek time for each transducing head as well as the average head switch time for each of the heads. The new seek times can be calculated from a table 600 or can be calculated and stored in the table format shown in FIG. 7. In each case, such a table can be stored in a computer-usable memory. Control information such as Tables 600 and 700 can be stored in a read-only memory associated with the disc drive 100 or on a reserve area of a disc 134 in the disc drive 100. The method shown and depicted by the flowchart shown in FIG. 5 can also be stored in a similar computer-readable memory. A set of instructions in a table can be transferred from the memory into the disc drive at a later date. For example, a set of instructions for setting up tables such as 600 and 700 can be downloaded from a floppy disc or downloaded from an Internet site in order to update the seek procedure performed by the disc drive 100.

The simple illustration above demonstrates how seek times can be improved for a particular disc drive with a high variance in average seek performances. In its actual implementation, it is important to measure the independent seek times for each head for different seek distances and a look-up table should be built into the servo firmware to decide when a head switch is faster than a normal seek and to use the method accordingly. With the table of seek and headswitch times generated during the disc drive's test process, the head-switch seek algorithm bas the flexibility of selecting the best head-switch and seek combination for the best overall performance.

Advantageously, the seek procedure set forth above and the apparatus for implementing the seek procedure allow for faster seeks. The seek procedure can be incorporated in microcode and used to control the servo circuitry to implement the invention. The information needed can easily be obtained during the manufacture of the disc drive. Obtaining the information needed can be accomplished without deviating substantially from manufacturing techniques close to current manufacturing techniques. The end result will be a reduction in access times to data.

Figure 8:
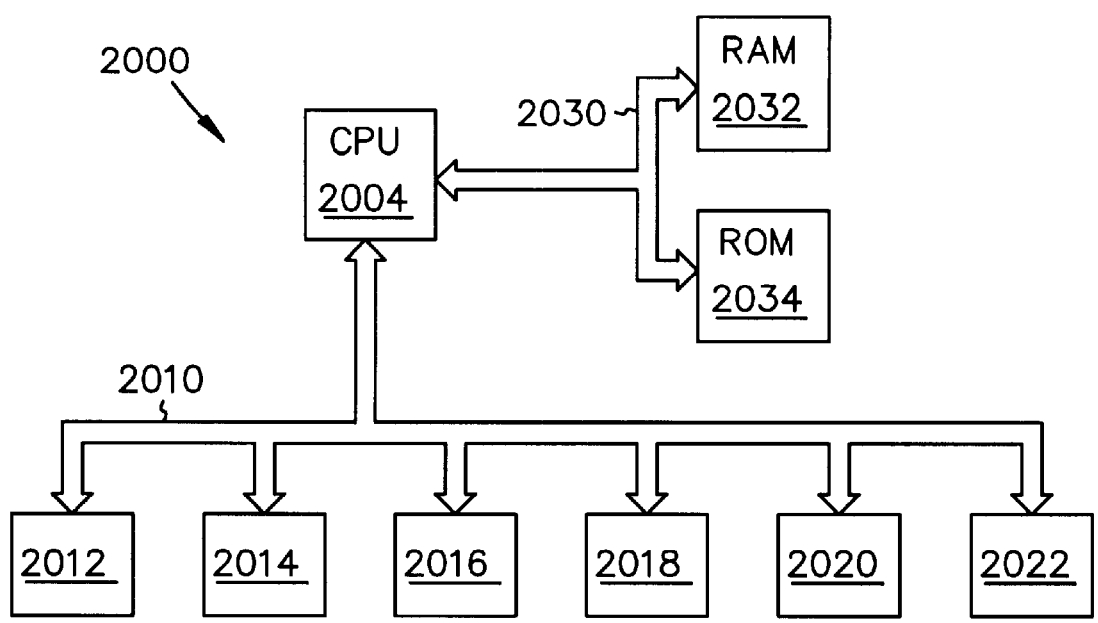
FIG. 8 is a schematic view of a computer system.

FIG. 8 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above Conclusion In conclusion, a disc drive 100 controls the movement of an actuator 120 in a disk drive 100 from a first track 234 to a second track 236 on a target surface. The actuator 120 has a plurality of transducers 126 attached to a plurality of arms 124 of the actuator 120. The method includes determining the average access times for each of the transducing heads in the disc drive 510, and measuring the amount of time for a head switch from each of the plurality of transducing heads 126 to the transducing head 126 of the plurality of transducing heads 126 having the shortest average access time 514. The average seek time associated with a transducing head on a target surface is compared to an amount of time associated with the average seek time of the transducing head having the shortest average seek time plus a head switch from the transducing head with the shortest average access time to the transducing head on the target track 522. A seek may be performed with a transducing head other than the transducing head associated with the target surface 530. Such a seek is performed when the amount of time associated with the average seek time of the transducing head on the target surface plus a head switch from the transducing head with the shortest average access time is less than the average seek time associated with a transducing head having the shortest average seek time 524.

The comparison 522 further includes storing the average seek times of each head on a table 600, 700 and determining the transducing head with the shortest average seek time 512 and performing head switches between the head with the shortest average seek time and each of the other transducing heads in the disc drive 514. In addition a value is stored for each of the other transducing heads equal to the average seek time for a particular head plus the head switch time between the particular transducer head and the transducer head with the shortest average seek time (see FIG. 7, column 4). The value for each of the transducing head ray be stored in a lookup table in memory 249 or on the disc 134. If on the disc 134, the lookup table is stored at a reserve area on one of the plurality of discs. When the lookup table is stored at a reserve area on one of the plurality of discs 134, the information is uploaded from the disc 134 to memory 249.

Also disclosed is a disc dive having a base 112, a disc 134 rotatably attached to the base 112. Servo information is stored on each of the surfaces of the disc 134. One of said surfaces of the disc has a first track 234 and a second track 236. The other of said surfaces has a third track 226 and a fourth track 228. An actuator 120 has a first transducer 150 for reading and writing to the first 234 and second track 236 and a second transducer 150 for reading and writing to the third 226 and fourth track 228. A computer usable storage medium 134, 249 having control information stored thereon for causes a suitably programmed disc drive 100 to seek from a first track 234 on the disc to a second track 236 on a disc using the transducer for reading the third 226 and fourth track 228 on the disc 134. The computer usable storage medium performs the following steps: seeking between the third 226 and fourth tracks 228 with the second transducer head 150, and switching from the second tansducer head 150 to the first transducer head 150. The computer usable storage medium stores control information indicating when the time associated with seeking between the third 226 and fourth tracks 228 with the second transducer 150 and switching from the second transducer 150 to the first transducer 150 is faster than seeking between the first 234 and second tracks 236 with the first transducer 150. The computer usable storage medium controls servo circuitry 230, 256, 246, 250, 252,242, 254,238 to seek between third 226 and fourth tracks 228 and switch to the first transducer 150 when it will be faster than seeking between the first 234 and second tracks 236 with the first transducer 150. The first 234 and third tracks 226 are within a first cylinder and the second 236 and fourth tracks 228 are within a second cylinder. The control information in the computer usable storage medium includes using the servo circuitry 230, 256, 246, 250, 252, 242, 254, 238 within the disc drive 100. The servo circuitry within the disc drive is to determine if a seek can be preformed in the disc drive between a first cylinder containing the first track 234 and the third track 226 and the a second cylinder containing the second track 236 and the fourth track 228 in loss time when seeking between the third 226 track and the fourth track 228 than between the first track 234 and the second track 236. This can be done at the time of manufacture.

Also disclosed is a disc drive including a base 112 and an actuator 120 rotatably attached to the base 112. The actuator 120 has a first end and a second end and further includes a transducing head 126 attached to the other of the first or second ends of the actuator. At least one disc 134 is rotatably attached to the base 112. The disc has a first surface and a second surface. The invention includes a device for performing a seek between tracks on a first surface while using information stored on the second surface and the transducing head on the second surface.

It is to be understood that the above description is intended to be illustrative, and not restrictive. Many other embodiments will be apparent to those of skill in the art upon reviewing the above description. The scope of the invention should, therefore, be determined with reference to the appended claims, along with the fill scope of equivalents to which such claims are entitled.

What is claimed is:

1. A method for controlling the movement of an actuator in a disk drive from a first track to a second track on a target surface, the actuator having a plurality of transducing heads attached to a plurality of arms of the actuator, the method comprising steps of:
   (a) deter an average access time for each of the plurality of transducers in the disc drive;
   (b) measuring an amount of time for a head switch from each of the plurality of transducers to the transducer of the plurality of transducing heads having a shortest average access time less than other transducing heads of the plurality of transducing heads; and
   (c) comparing the average seek time associated with a transducing head on a target surface to an amount of time associated with the average seek time of the transducing head having the shortest average seek time and a head switch from the transducing head with the shortest average access time to a transducing head on the target track.

2. The method of claim 1 further comprising a step (d) of performing a seek with a transducing head other than the transducing head associated with the target surface.

3. The method of claim 1 further comprising a step (d) of performing a seek with a transducing head other than a transducing head associated with a target surface when an amount of time associated with the average seek time of a transducing head on the target surface plus a head switch from a transducing head with the shortest average access time is less than an average seek time associated with a transducing head having the shortest average seek time.

4. The method of claim 1 wherein the comparing step (c) further comprises:
   (c)(i) storing the average seek times of each transducing head on a table; and
   (c)(ii) determining a transducing head with the shortest average seek time; and wherein the measuring step (b) further includes
   (b)(j) performing head switches between a head with the shortest average seek time and each of the other of the plurality of transducing heads in the disc drive.

5. The method of claim 4 wherein comparing step (c) further comprises (c)(iii) storing a value for each of the other transducing heads equal to the average seek time for a selected transducing head plus the head switch time between the selected transducing head and the transducing head with the shortest average seek time.

6. The method of claim 5 wherein a value for each of the transducing heads is stored in a lookup table in memory.

7. The method of claim 5 wherein a value for each of the transducing bhads is stored in a lookup table on the disc.

8. The method of claim 7 wherein the disc drive further comprises a plurality of discs, the lookup table is stored at a reserve area on one of the plurality of discs.

9. The method of claim 7 wherein the disc drive further comprises a plurality of discs, the lookup table is stored at a reserve area on one of the plurality of discs, the lookup table is uploaded from the disc to memory.

10. A disc drive comprising:
    a base;
    a disc rotatably attached to the base, servo information being stored on one of the surfaces of the disc at a first circumferential position and at a second circumferential position and servo information being stored on the other of the surfaces of the disc at substantially the same first circumferential position and at substantially the same second circumferential position, one of the surfaces of the disc having a first track and a second track and the other of the surfaces having a third track and a fourth track;
    an actuator having a first transducer for reading and writing to the first and second track and a second transducer for reading and writing to the third and fourth track; and
    a computer usable storage medium having control information stored thereon for causing a suitably programmed disc drive to seek from a first track on the disc to a second track on a disc using the transducer for reading the third and fourth track on the disc.

11. A disc drive comprising:
    a base;
    a disc rotatably attached to the base, servo information being stored on each of the surfaces of the disc, one of the surfaces of the disc having a first track and a second track and the other of the surfaces having a third track and a fourth track;
    an actuator having a first transducer for reading and writing to the first and second track and a second transducer for reading and writing to the third and fourth track; and a computer usable storage medium having control information stored thereon for causing a suitably programmed disc drive to seek from a first track on the disc to a second track on a disc using the transducer for reading the third and fourth track on the disc, wherein the control information on the computer usable storage medium performs:
       seeking between the third and fourth tracks with the second transducer; and
       switching from a second transducer head to a first transducer.

12. The disc drive of claim 11 wherein the computer usable storage medium stores control information indicating when a time associated with seeking between the third and fourth tracks with the second transducer plus switching from the second transducer to the first transducer is shorter than a time for seeking between the first and second tracks with the first transducer.

13. The disc drive of claim 11 wherein the computer usable storage medium stores control information indicating when the time associated with seeking between the third and fourth tracks with the second tansducer plus switching from the second transducer to the first transducer is shorter than a time for seeking between the first and second tracks with the first transducer, the control information controlling servo circuitry to seek between the third and fourth tracks and switch to the first transducer when the time will be shorter than the time for seeking between the first and second tracks with the first transducer.

14. The disc drive of claim 11 wherein the first and third tracks are within a first cylinder and the second and fourth tracks are within a second cylinder.

15. The disc drive of claim 11 wherein the control information in the computer usable storage medium includes instructions regarding use of a servo circuit within the disc drive.

16. The disc drive of claim 11 wherein the control information in the computer usable storage medium includes instructions regarding use of a servo circuit within the disc drive to determine if a seek can be performed in the disc drive between a first cylinder containing the first track and the third track and the a second cylinder containing the second track and the fourth track in less time when seeking between the third track and the fourth track than between the first track and the second track.

17. The disc drive of claim 11 wherein the control information in the computer usable storage medium includes instructions regarding use of a servo circuit within the disc drive at a time of manufacture to determine if a seek can be performed in the disc drive between a first cylinder containing a first track and a third track and the a second cylinder containing a second track and a fourth track in less time than seeking between the third track and the fourth track than between the first track and the second track.

18. A disc drive comprising:

a base;

an actuator rotatably attached to the base, the actuator having a first end and a second end and further comprising a transducing head attached to the other of the first or second ends of the actuator;

at least one disc rotatably attached to the base, the disc having a first surface and a second surface; and means for performing a seek between tracks on a first surface while using information stored on the second surface and the transducing head on the second surface.

* * * * *